K. H. MENKE.
WATER MOTOR.
APPLICATION FILED JAN. 30, 1911.

1,014,164.

Patented Jan. 9, 1912.

Witnesses
P. H. Baughman
F. A. Bullington

Inventor
Karl N. Menke,
By Witzenberg
Attorney.

UNITED STATES PATENT OFFICE.

KARL H. MENKE, OF PORTLAND, OREGON.

WATER-MOTOR.

1,014,164.
Specification of Letters Patent.
Patented Jan. 9, 1912.

Application filed January 30, 1911. Serial No. 605,618.

*To all whom it may concern:*

Be it known that I, KARL H. MENKE, a citizen of the United States, residing in the city of Portland, county of Multnomah, and State of Oregon, have invented certain new and useful Improvements in Water-Motors, of which the following is a specification.

My invention relates to water motors, and more particularly to a construction and arrangement of mechanism adapted to take advantage of the heavy surging back and forth of a large body of water, as distinguished from shore currents, tide waves and other surface and shore movements of the water.

I am aware that many attempts have been made to gather power from tide action, waves, currents and streams, but on account of uncertainty of direction, of volume, and, at many times, the absence of sufficient action of any kind, these methods or attempts have had many objections.

Among the salient objects of my invention are, to provide a structure at considerable distance out from the shore in the sea, with heavy motors below the surface of the water and so constructed and arranged that they will be operated by the heavy surging movement back and forth in any direction; to provide a water motor comprising companion members carried by a common driving shaft or member, which said companion members are adapted to be operated by the heavy surging movement of a great body of water in either direction to drive said shaft or member in one direction, said motors being actuated, respectively, in the same direction by the movement of the water in opposite directions; and, in general, to provide improvements in the construction and arrangement of water motors, and in the location of the same, whereby to take advantage of the heavy surging movement of the sea for developing power.

My invention will be readily understood from the following description of one embodiment thereof, taken in connection with the accompanying drawings, in which,—

Figure 1:
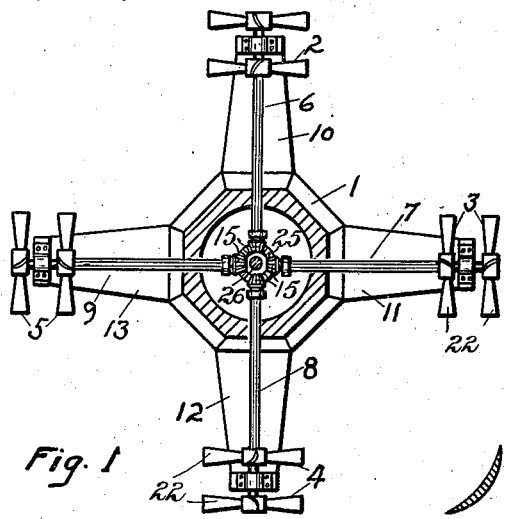
Figure 4:
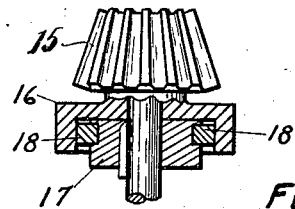
Figure 5:
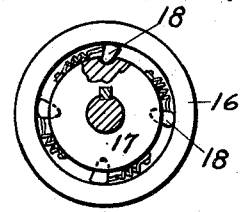
Figure 2:
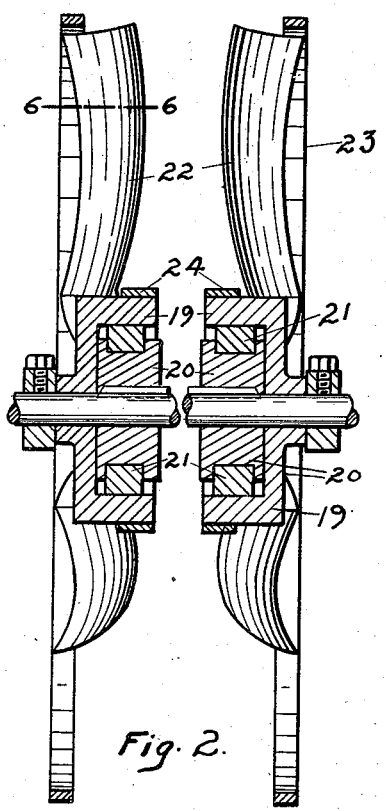
Figure 3:
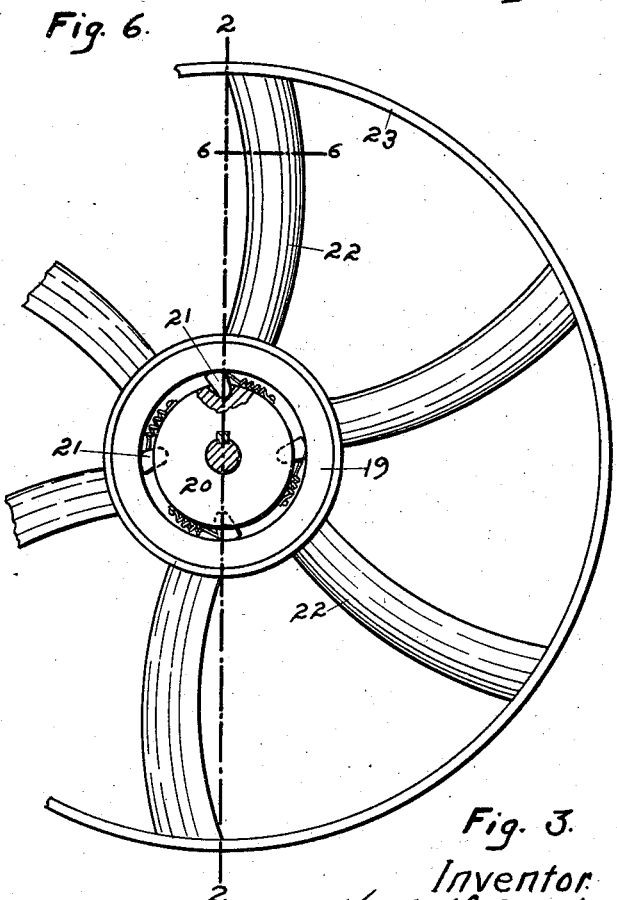

Figure 1 is a plan view, partly in section, of a structure showing the application of my invention; Fig. 2 is a cross sectional view through two of the companion wheels or motors; Fig. 3 is a face view, with parts broken away, of one of said motor wheels; Fig. 4 is an enlarged view, partly in section, of one of the transmission gears; Fig. 5 is an elevation of a clutch mechanism thereof; and Fig. 6 is a cross sectional view through one of the vanes of a wheel or motor.

Referring now to the drawings, I will first describe the general application of the invention. Instead of undertaking to harness the surface waves, tide movements and currents of the water, I propose to build a structure out at sea some distance from the shore where the full effect of the heavy surging of the water can be had. This structure should be of masonry, concrete or other strong construction, such as is used for light house purposes, and upon reefs or rocks at suitable locations from the shore to insure full benefit of the long surging movement of the body of water in which it is built. In the drawings I have shown a structure 1 of octagon shape, provided with four sets, 2, 3, 4 and 5, of my companion water wheels or motors, carried at the outer ends of long driving shafts 6, 7, 8 and 9, with suitable structure or brace members, as 10, 11, 12 and 13, supporting the outer ends of said shafts and said motors. I propose to project one or more of these companion motors from different sides of the structure, whereby some of them will always be in operation, depending upon the general direction of the surging movement of the water. The driving or transmission shafts are suitably anchored and provided with suitable bearings. In the present embodiment of the invention, I have shown each shaft carrying upon its inner end a beveled gear, as 15, shown in Fig. 4, and comprising the gear portion 15 and a clutch casing 16, preferably formed together and adapted to run loosely upon the shaft. Mounted upon the shaft within said clutch casing is a clutch disk or member 17, secured to the shaft and turning therewith. Mounted around said clutch member 17 to engage the inner face of the clutch casing 16, are a number of spring actuated clutch dogs, as 18—18, standing in such position and relationship to said clutch casing that when said shaft and clutch member turn in one direction, said dogs immediately engage the clutch casing and transmit movement to the gear, but when the shaft turns in the opposite direction, said clutch dogs do not operate, but permit said shaft and clutch member 17 to turn within the clutch casing, and the gear stands still. Any means for transmitting the power from the shaft may be used, whether by belt or by clutch mechanisms.

The motor proper comprises, in each case, a pair of companion water wheels, facing in opposite directions and mounted upon the outer end of a supporting and driving shaft at such distance from the structure that the full benefit of the heavy surging movement back and forth of the body of water can be secured to operate said wheels or motors. These wheels or motors each comprise, in the present showing, a hub or casing 19, mounted to turn loosely upon the shaft, with a clutch member 20 mounted upon the shaft to turn therewith and provided with clutch dogs, as 21, which operate to lock the clutch member 20 to the hub or case 19, whereby to drive the shaft from the wheels. Said wheels or motors are preferably made of cast iron or other suitable material of strength, and comprise each a series of blades or vanes, as 22, curved in cross section, as indicated in Fig. 6, and also curved longitudinally, as indicated in Figs. 2 and 3, with strengthening rib or band 23 around the outer ends thereof and of such width and so placed as to interfere as little as possible with the escape of the water from the vanes of the wheel. I also provide a band, as 24, around the hub or casing 19 in order to give additional strength at the place where the power is transmitted to the shaft through the clutch member 20 and the dogs 21.

It will be noticed that I make the clutch member comparatively large in order to give as much leverage as possible in transmitting the movement of the wheels or motors to the shaft. I provide two oppositely facing companion wheels or motors at the end of each shaft, the outer wheel being arranged to be operated by the incoming movement of the water, that is, as the water moves toward the structure, and transmitting rotary movement to the shaft, while the inner wheel is positioned to be operated by the outgoing movement of the water, that is, as the water moves away from the structure and transmits rotary movement to the shaft in the same direction. With these companion motors working upon the same shaft and projected beneath the surface of the water at some distance from the structure in all directions, it will be understood that the heavy surging movement of the water operates upon the sets of motors which are in alinement with the back and forward movement of the water. When the outer wheel or motor, for example, is under operation and driving the shaft upon which it is mounted, the inner wheel or motor, under the operation of the water passing through the outer wheel, runs loosely upon the shaft, and as soon as the body of water returns, the inner wheel then comes into operation to continue the movement of the shaft, while the outer wheel runs loosely upon the shaft. By this construction it will be seen that the motors are placed beneath the surface of the water sufficiently, and out from the shore for such distance, as will bring against them, in opposite directions, the heavy surging movement of the surrounding body of water, and in which there is much power. The power is transmitted from shafts 6, 7, 8 and 9 through the gears 15, to a beveled gear 25, mounted upon a vertical shaft 26, from which the power is taken in any manner desired.

I am aware that slight modifications and changes can be made in the application of the invention, and I do not, therefore, limit the invention to the particular showing here made for purposes of illustrating it.

I claim:

1. In a water motor, the combination with transmission means, of oppositely facing companion water wheels or motors adapted to be actuated, respectively, in the same direction, by the movement of water therethrough in opposite directions, and clutch mechanism for locking said wheels or motors to said transmission means when turning in one direction and permitting them to run loosely when turning in the opposite direction.

2. In a water motor, the combination with a transmission shaft, of oppositely facing companion water wheels or motors adapted to be actuated, respectively, in the same direction, by the movement of water therethrough in opposite directions, clutch mechanism for locking said wheels or motors to said shaft when turning in one direction and permitting them to run loosely when turning in the opposite direction, and means supporting said motors beneath the surface at a distance from the shore to bring same within the heavy surging movement of the water.

3. In a water motor, the combination with a transmission shaft, of oppositely facing companion wheels or motor members, each comprising a hub or casing, a plurality of vanes set at an angle and concaved in cross section, a clutch mechanism within said hub or casing for locking said wheels or members to said transmission shaft when turning in one direction and for permitting them to run loosely when turning in opposite direction, substantially as shown and described.

4. In a water motor, the combination with a transmission shaft, of oppositely facing companion water wheels or motors, each comprising a hub or casing, a plurality of concaved and curved vanes set at an angle whereby to be engaged by the advancing body of water, clutch mechanism for locking said wheels or motors to said transmission shaft when turning in one direction and for permitting them to run loosely when turning in the opposite direction, substantially as shown and described.

5. A water motor, comprising in combination, a supporting structure built at a distance from the shore in the sea, a plurality of transmission shafts projected from said structure in different directions beneath the surface of the water, transmission mechanism for the inner ends of said shafts, and companion water motors mounted upon the outer end of each shaft, said motors facing in opposite directions and arranged to be actuated, respectively, in the same direction by the movement of the surrounding body of water in opposite directions, and clutch mechanism for locking said motors to said transmission shafts when turning in one direction, and for permitting them to run loosely when turning in the opposite direction.

6. A deep water motor comprising a supporting structure at sea, a plurality of transmission shafts projected from said structure in different directions beneath the surface of the water, transmission mechanism for the inner ends of said shafts, and companion water wheels or motors mounted upon the outer end of each shaft, said motors facing in opposite directions and arranged to be actuated, respectively, in the same direction by the movement of the surrounding body of water in opposite directions, a clutch mechanism for locking said motors to said transmission shaft when turning in one direction, and for permitting them to run loosely when turning in the opposite direction, and supporting brace members supporting the outer ends of said shafts and motor members at a distance from the structure, substantially as referred to.

Signed at Portland, Oregon, January 19th, 1911.

KARL H. MENKE.

In presence of—
JOHN G. PAGE,
W. A. BURKE.

---

Copies of this patent may be obtained for five cents each, by addressing the "Commissioner of Patents, Washington, D. C."